United States Patent [19]

Salvatori et al.

[11] Patent Number: 5,027,672
[45] Date of Patent: Jul. 2, 1991

[54] GEAR SHIFT FORK INSERT

[75] Inventors: David A. Salvatori, South Lyon; Edward Perosky, Sterling Heights; Frank T. Frederick, Rochester, all of Mich.

[73] Assignee: Chrysler Corporation, Highland Park, Mich.

[21] Appl. No.: 610,622

[22] Filed: Nov. 8, 1990

[51] Int. Cl.[5] .................. G05G 3/00; F16D 13/60
[52] U.S. Cl. .................. 74/473 R; 192/82 R
[58] Field of Search .............. 74/473 R, 477, 597; 192/82 R

[56] References Cited

U.S. PATENT DOCUMENTS

| H,295 | 7/1987 | Numazawa et al. | 74/473 R |
|---|---|---|---|
| 3,257,861 | 6/1966 | Siefferman | 74/473 R |
| 3,915,027 | 10/1975 | Simmons et al. | 192/82 R X |
| 4,238,012 | 12/1980 | Takiguchi et al. | 74/473 R X |
| 4,315,698 | 2/1982 | Takahashi et al. | 74/473 R X |
| 4,353,449 | 10/1982 | Lamy et al. | 74/473 R X |
| 4,495,831 | 1/1985 | Takahashi | 74/473 R |
| 4,529,080 | 7/1985 | Dolan | 74/473 R X |
| 4,531,623 | 7/1985 | Arai et al. | 74/473 R X |
| 4,621,537 | 11/1986 | Piazza et al. | 74/477 |
| 4,633,729 | 1/1987 | Scalisi et al. | 74/477 |

FOREIGN PATENT DOCUMENTS 54-144581 11/1979 Japan ................ 74/473 R

Primary Examiner—Allan D. Herrmann
Assistant Examiner—David W. Laub
Attorney, Agent, or Firm—Edward P. Barthel

[57] ABSTRACT

An automobile transmission shift fork has its free branch ends formed with diametrically opposed notches with each notch engaging an improved plastic insert adapted to be received in an annular groove of a shift element. The insert has individual side walls interconnected by an intermediate spacer block designed for fixed conforming reception in an associated branch end notch. This arrangement substantially increases the effective insert side wall thrust face area relative to the groove abutting radial side thrust surface obviating the need to increase the depth of an existing shift element groove. The insert has an indented stop wall which engages its associated notch back wall upon fixed reception in its notch. The spacer block exceeds the notch depth by a predetermined differential dimension establishing paired insert raised edges adapted to ride on the annular groove base surface eliminating metal-to-metal contact therebetween. Each insert side wall thrust face is formed with mirror image convex curved surface portions at its ends providing rolling line contact with its groove thrust side surface during shift element tilting thereby increasing insert service life. The convex curved surface portions define, with their opposed shift element groove radial side thrust surface, lubricating oil reservoirs thereby improving oil distribution to the thrust surface.

5 Claims, 3 Drawing Sheets

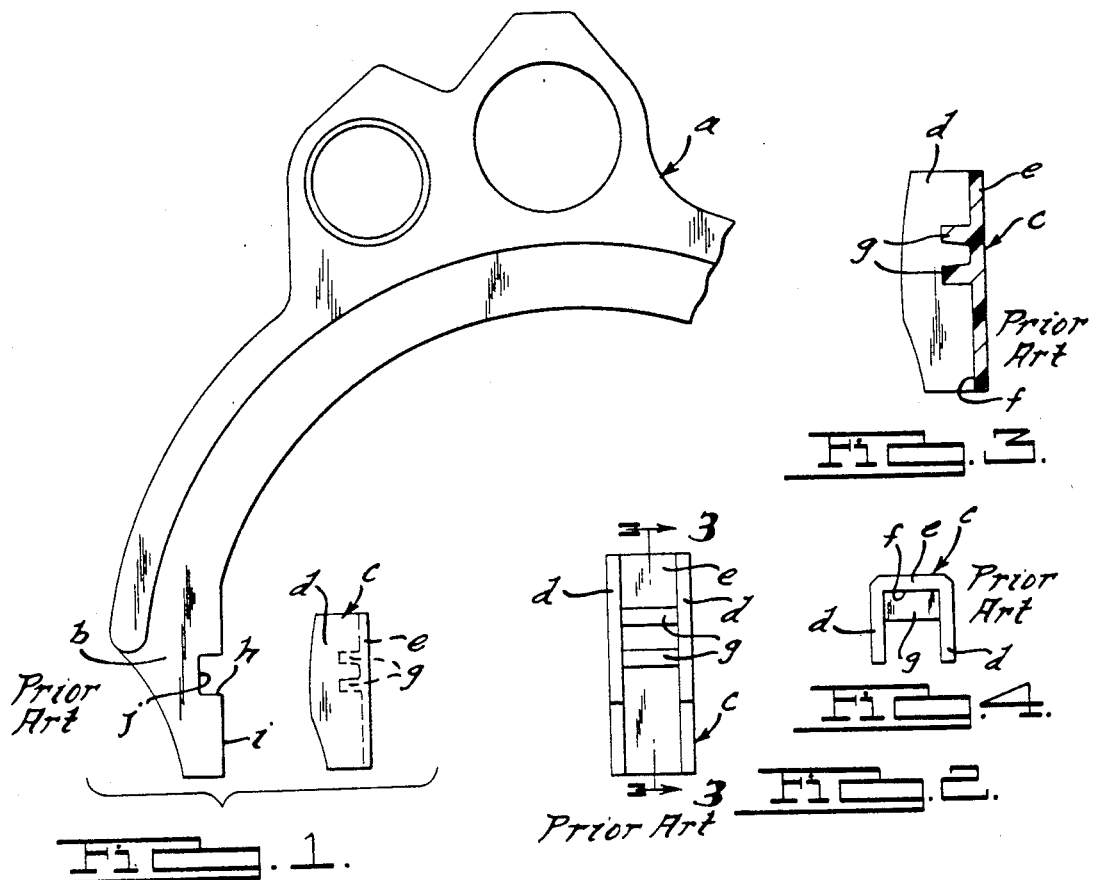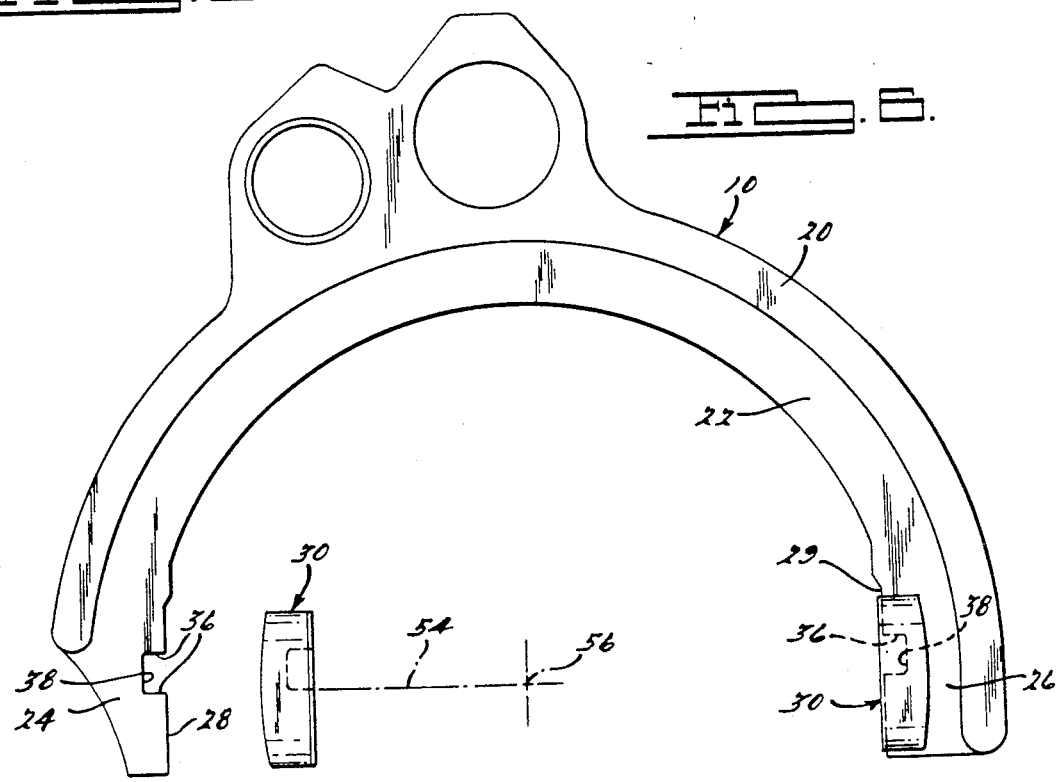

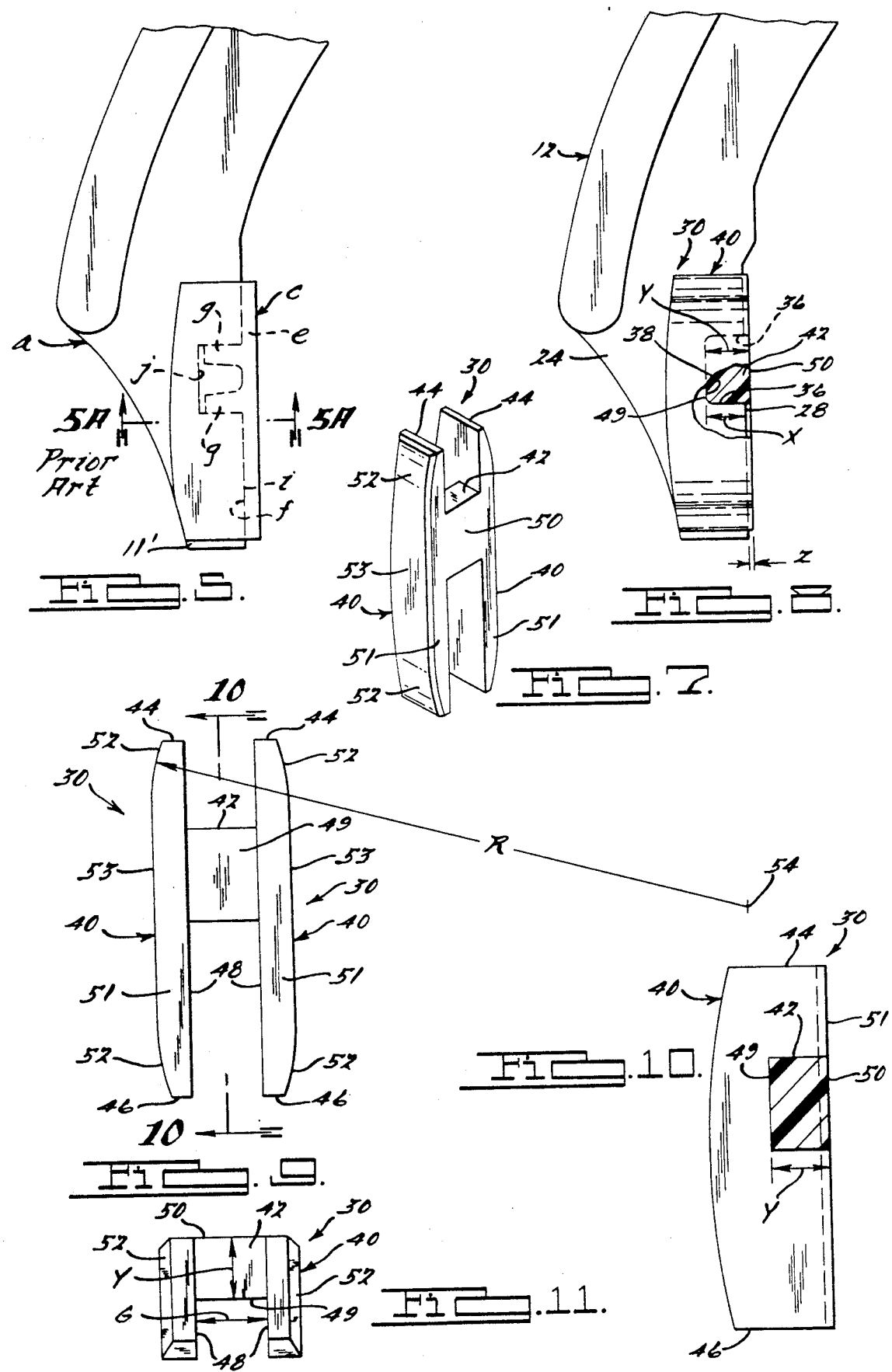

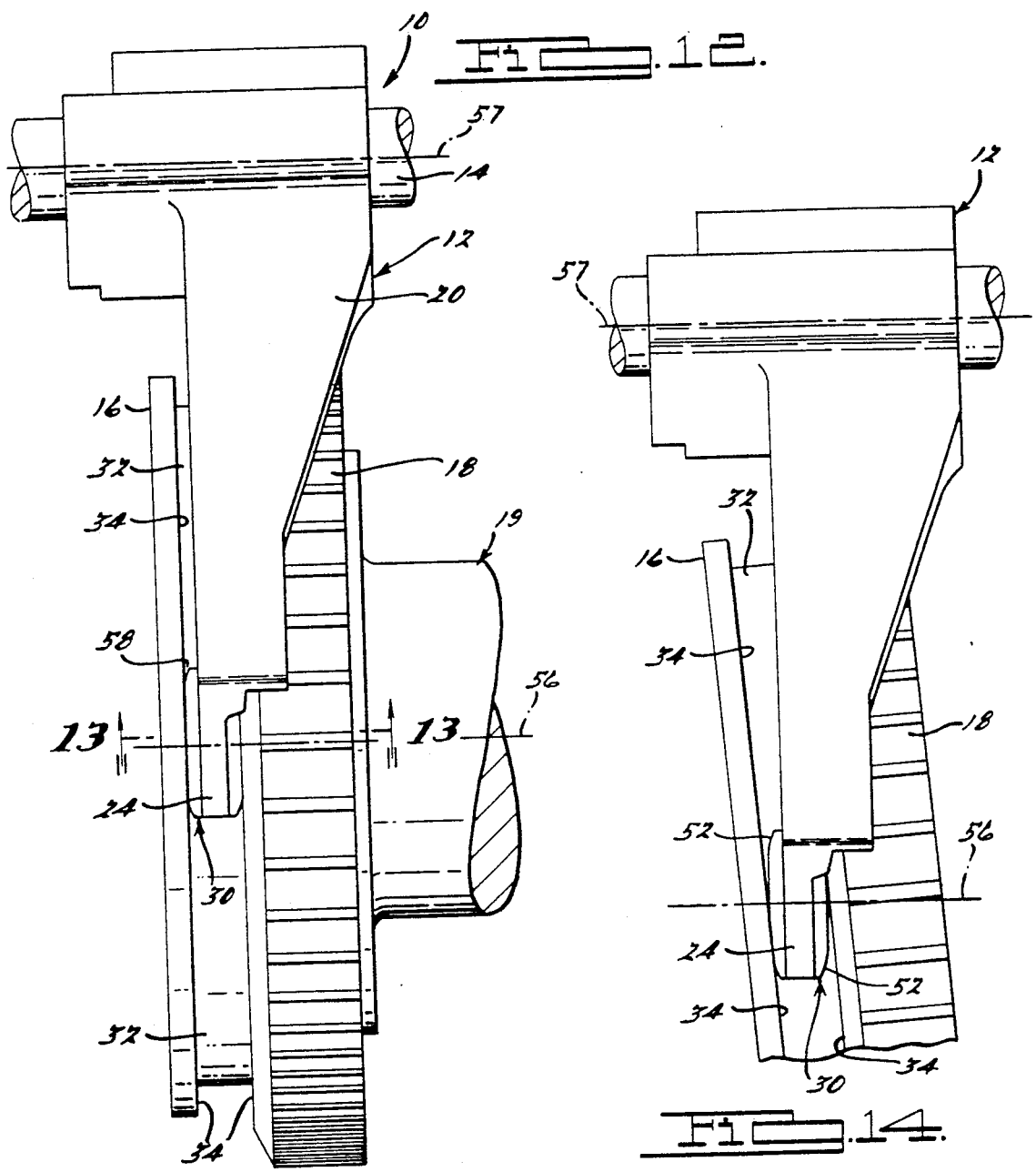
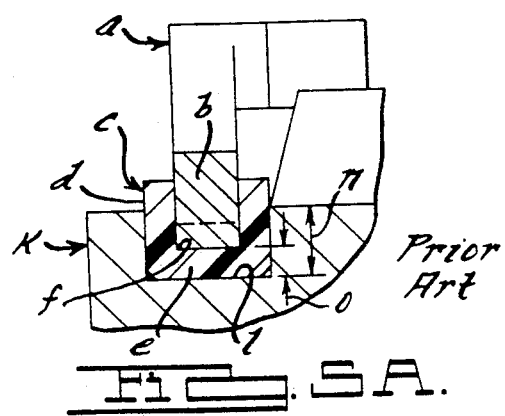
Prior Art

GEAR SHIFT FORK INSERT

BACKGROUND OF THE INVENTION

This invention relates generally to vehicle transmission gear shifter fork friction shoe inserts and more particularly to improved replaceable inserts providing increased insert life.

It is known to use replaceable plastic inserts fixed to gear shift fork bodies and adapted to engage an annular groove in a shiftable transmission element such as a synchronizer gear hub collar. An example of one such insert is found in U.S. Pat. No. 3,257,861 issued June 28, 1966 to M.E. Siefferman entitled Gear Shifter Fork assembly. The Siefferman patent discloses a single insert comprising a pair of axially spaced semicircular walls rigidly interconnected by a wall like bridge which loosely engages a notch in the fork to thereby prevent relative rotation between the insert and the fork. The notch is placed intermediate the circumferentially opposite ends of the fork flange whereby the insert and fork abutment surfaces are in substantially full circumferentially confronting or bearing contact to one another even though slight misalignment occurs between the fork and shifted element. The U.S. Pat. No. 4,238,012 issued Dec. 9, 1980 to Takeguchi et al. discloses a shift fork friction shoe insert that is tightly fixed to the main body and made of material having a high wear resistibility copper alloy such as high manganese brass. The insert is in the shape of a channel section and has elastomeric tongue-like projections extending from the bottom of the channel section. The projections are urged into grooves formed at the end parts of the fork main body.

The U.S. Pat. No. 4,495,831 issued Jan. 29, 1985 to Takashashi discloses a shift fork having an upwardly extending branch whose upper end is bevelled to introduce dripping lubricant to sliding surfaces of the collar and shift fork branch.

A conventional friction shoe insert is depicted in prior art FIGS. 1-5. FIG. 1 shows a portion of a transmission shift fork, generally indicated at "a", wherein each of its branch free ends "b" is provided with an insert "c" formed of suitable plastic material. The inserts "c" are channel shaped in horizontal section, as seen in FIG. 4, having a pair of side walls "d" joined by a base wall "e". FIG. 3 shows base wall inner face "f" formed with a pair of cross ribs "g" adapted for reception in a corresponding rectangular notch "h" provided in each free end "b".

It will be noted in FIG. 5 that the insert base wall inner face "f" is in flush contact with inboard surface "i" of the branch free end "b"while the insert cross ribs "g" are spaced from notch back wall "j". As seen in FIG. 5A the fork "a" is adapted to move a sleeve or collar shift element "k" on a transmission main shaft (not shown) by virtue of each fork insert "c" being received in an annular U-shaped groove "1" formed on the outer circumference of collar "k". Each side wall "d" of the insert defines a thrust face having a predetermined bearing load support area, i.e. the insert side wall area carrying the force of the sleeve and the fork. In FIG. 5A that the insert thrust face bearing load support area is shown as the confronting contact area of the annular groove "1" radial thrust surface portion in flush abutment with the opposed insert side wall portion "d" is indicated by radial dimension "n". FIG. 5A shows that a substantial portion of the axial thrust bearing area, denoted by dimension "n", comprises the plastic insert base wall "e" having a thickness indicated by dimension "0". It wil be appreciated that a substantial portion, in the order of forty percent in the present example, of the insert side wall abutment area is not backed or supported by the fork branch end "b" when subjected to axial thrust loads. As a result such prior art inserts "c" provide reduced service life and possible shear failure of the base wall "e" under extended shift induced thrust loading.

SUMMARY OF THE INVENTION

It is an object of the present invention to provide an improved shift fork plastic insert for reception in a transmission shift element annular groove that achieves a substantially increased insert axial thrust load support area relative to its fork branch end without modification of the existing shift element.

It is a further object of the present invention to provide an improved plastic insert arrangement as set forth above wherein each plastic insert includes a notched-out spacer block which is positionally received in a conforming fork notch such that a pair of raised insert bearing edges are established thereby obviating metal-to-metal contact with the cylindrical surface of the shift element groove.

It is still another object of the invention to provide an improved plastic insert arrangement as set forth above wherein each insert side wall thrust face having curved contact end surface portions formed about a common transverse axis of curvature whereby each end surface portion forms a rolling line contact with its associated shift element groove radial thrust surface resulting from tolerance induced shift element tilt during travel on its support shaft thereby improving insert service life.

It is an additional object of the invention to provide an improved plastic insert as set froth above wherein each insert curved contact surface portion defines, with its opposes shift element groove radial side thrust surface, a lubricating oil reservoir for improved oil distribution to the sliding surfaces.

These and other objects and advantages of the present invention will be readily apparent by reference to the following description of the preferred embodiment and appended drawings.

BRIEF DESCRIPTION OF THE DRAWINGS

FIG. 1 is a fragmentary exploded side elevational view of a prior art shift fork and prior art friction shoe insert therefore;

FIGS. 2, an enlarged front elevational detail view of the prior art insert shown in FIG. 1;

FIG. 3 is a vertical sectional view taken on the line 3—3 of prior art FIG. 2;

FIG. 4 is an enlarged top elevational detail view of the prior art insert shown in FIG. 1;

FIG. 5 is an enlarged fragmentary assembly view of the prior art insert and fork of FIG. 1;

FIG. 5A is an enlarged framgentary sectional view taken on the line 5A—5A of prior art FIG. 5;

FIG. 6 is a side elevational view of a transmission shift fork and insert pads, with the left hand insert shown in exploded form, according to the present invention;

FIG. 7 is an enlarged perspective view of an insert according to the present invention;

FIG. 8 is an enlarged fragmentary assembly view of the insert according to the present invention;

FIG. 9 is an enlarged front detail elevational view of the insert according to the present invention;

FIG. 10 is a vertical sectional view taken on the line 10—10 of FIG. 9;

FIG. 11 is a top elevational view of the insert of FIG. 9;

FIG. 12 is an enlarged side elevational view of the fork of FIG. 6 shown in engagement with a sliding collar circumferential groove;

FIG. 13 is an enlarged fragmentary horizontal sectional view taken on the line 13—13 of FIG. 12; and FIG. 14 is a view similar to FIG. 12 showing the collar in tilted relation to the principal axis of the main shaft, with the tilt angle being exaggerated for the purpose of explanation.

DETAILED DESCRIPTION OF THE INVENTION

With reference to FIG. 12 of the drawings, a portion of a vehicle manual transmission shifting mechanism constructed in accordance with the present invention is generally indicated by the reference numeral 10. The shifting mechanism includes a shift fork 12, disposed within a transmission case (not shown), slidably carried on shaft fork rod 14. The shift fork engages a shift element which in the disclosed embodiment is in the form of a sleeve or collar shift element 16 integrally formed in a concentric manner with a transmission toothed spur gear 18. The collar 16 and spur gear 18 are splined on a transmission ouput or main shaft 19 to rotate together therewith along with a synchronizer clutch (not shown) in a conventional manner. Reference may be made to U.S. Pat. No. 4,633,729 issued Jan. 6, 1987 for a detailed description of one form of manually operated transmission.

The shift fork, as seen in FIG. 6, comprises a cast iron fork body 20 formed with an internal semi-circular flange plate 22 having a pair of free branch end portions 24 and 26. The branch end portions 24 and 26 include vertically disposed internal clearance surfaces 28 and 29, respectively, each formed with mirror image diametrically opposed rectangular notches. The notches are adapted to removably retain identical inserts 30 of the present invention. Each insert 30 is formed or molded of a suitable synthetic resin material. In the preferred embodiment of the invention, the synthetic resin material may be purchased from the Amoco Company and is sold under The Trade Mark "Torlon". Each insert 30 and its associated fork branch end 24 or 26 is adapted to be received in an annular or circumferential channel-shaped groove formed in the gear collar 16. As seen in FIG. 13 the annular groove is defined by a cylindrical base surface 32 and a pair of opposed radially extending side thrust surfaces 34.

With reference to FIG. 8 each of the fork notches is defined by parallel opposed upper and lower flanks 36 ending in a back side 38 extending normally thereto. The back side 38 has a predetermined depth relative to its associated clearance face 28 indicated by dimension "X". As the inserts 30 and their associated fork branch end portion notches are identical only the left hand insert and its associated branch end portion 24, shown in FIG. 8, will be described in detail.

FIG. 9 depicts the insert 30 as being symmetrical about a vertically disposed transverse plane which includes the section line 10—10. Each insert 30 comprises a pair of vertically disposed elongated fore and aft walls 40—40 joined by a rectangular spacer block 42 positioned intermediate upper and lower ends 44 and 46, respectively, of each wall 40. The spacer block 42 establishes a predetermined gap, indicated by dimension "G" in FIG. 11, formed between two opposing inside parallel surfaces 48—48 of the walls.

As seen in FIG. 8 the spacer block 42 has a depth "Y" between its indented outboard stop wall 49 and its inner flush wall 50. It will be noted that the dimension "Y" is slightly greater, by differential dimension "Z", than the notch depth dimension "X". By virtue of the predetermined differential dimension "Z" each insert wall 40, upon being attached to branch end portion 24, establishes a raised inboard bearing edge 51 that overhangs the fork clearance surface 28 by the differential dimension "Z". In the preferred embodiment the differential dimension "Z" is of the order of 0.15 mm. The insert gap "G" recevies branch end portion 24 therein upon the spacer block 42 being positionally inserted in its associated fork notch in a snug conforming manner. It will be noted that by virtue of the back wall 38 being positioned in flush abutting contact with spacer block stop wall 49 providing the differential dimension "Z" and thereby establishing the pair of raised bearing edges 51, as shown in FIG. 13.

The improved shift fork 12 insert 30 assembly of the present invention are adapted for use in combination with an existing transmission shift element or collar 16, such as the prior art shift element "k". Thus, the new shift fork and insert assembly are adapted to provide a substantially increased insert thrust load area in combination with the existing collar groove depth.

It will be seen in FIG. 7 that each insert wall 40 outside thrust surface comprises upper and lower convex curved arcuate surface portions 52 at each end thereof joined by an intermediate planar abutment surface portion 53. FIG. 9 shows that the pair of arcuate convex curved surface portions 52 are each part of an imaginary cylindrical surface having a predetermined radius "R" with its center of curvature located on the principal axis 54 of the imaginary cylindrical surface. With reference to FIG. 6 it will be seen that the principal axis of curvature 54 of the imaginary cylindrical surface intersects the transmission main shaft axis 56 shown in FIG. 12. As seen in FIG. 12, the main shaft axis 56 is parallel with shift fork rod axis 57.

FIG. 14 is an exaggerated depiction of the collar 16 being slightly canted or tilted from a normal vertically disposed transversely extending plane relative to the main shaft axis shown at 56 in FIG. 12. It will be appreciated that upon the collar 16 undergoing such a tipping, resulting from system stack-up tolerance variations, each insert arcuate surface portion 52 will provide a rolling line contact area with its associated collar groove thrust surface 34. Such rolling line contact areas minimizes stress concentrations caused by axial thrust loads applied to the inserts 30 during fork shifting operations.

An additional feature fo the convex curved surface portions 52 is shown in FIG. 12. As a result of lubricating oil flowing along the groove thrust side surfaces 34 the oil is trapped and collected in reservoir pockets 58 formed between the convex curved surface portions 52 and the thrust side surfaces 34. Such trapped oil is adapted to be distributed to its associated groove side thrust surface 34 thereby improving the lubrication between of the sliding surfaces and the inserts 30.

While only one embodiment of the present invention has been described, other embodiments and modifications are possible without departing from the scope of the appended claims.

What is claimed is:

1. A shifting mechanism in an automotive transmission comprising a shift element supported on a longitudinally extending main shaft of the transmission and a fork body supported on a fork shaft having its axis parallel to said main shaft for axial travel thereon, said fork body having a pair of downwardly extending branch ends, each said branch end supporting an insert thereon formed of synthetic resin material, each said insert engaging a circumferential groove in said shift element for shifting the transmission, said groove having a channel-shape defined by a cylindrical base surface and a pair of opposed transverse side thrust surfaces, the improvement in said shifting mechanism comprising:

said fork a body having a metal plate member formed with a pair of branch planar ends, said branch planar ends having inboard opposed vertical clearance faces formed with mirror image rectangular-shaped notches, each said notch having an open side, parallel opposed upper and lower end flanks, and a back side having a predetermined transverse depth relative to its associated clearance face;

each said insert having a pair of vertically elongated fore and aft mirror image opposing axially spaced walls, said walls separated by a rectangular spacer block providing a uniform predetermined axial space therebetween, said spacer block positioned intermediate upper and lower ends of said pair of walls and adapted for fixed conforming reception in an associated one of said notches, each said insert pair of walls two opposite outside thrust faces and two opposing inside wall faces with said pair of side walls defining a pair of inboard elongated bearing edges;

said spacer block having axial ends each integrally joined to an associated insert inside wall surface, said spacer block having a radially outboard indented stop wall and an opposite radially inboard flush wall coplanar with its associated inboard bearing edges, said spacer block indented stop wall spaced from said spacer block flush wall be a dimension greater than its associated notch depth providing a predetermined differential dimension therebetween;

whereby upon insertion of each said insert spacer block fixed in its associated notch its indented stop wall engages its associated notch back side such that its pair of side wall bearing edges are raised above their associated clearance face by reason of said predetermined differential dimension wherein each said pair of insert bearing edges provide the sole contact with said groove cylindrical base surface obviating metal-to-metal contact between each said fork clearance face and said groove base.

2. The improved shifting mechanism as set forth in claim 1, wherein each said insert side wall thrust face formed with a convex curved surface portion adjacent its upper and lower free ends, each said convex curved surface portion defined by a common imaginary cylindrical surface having the principal axis thereof coinciding with a transverse axis of said main shaft, whereby during travel of said shift element on said main shaft tolerance variations causing said shift element to be tipped at a slight angle from its normally disposed transverse plane relative to said main shaft axis during axial travel, a respective one of said insert convex curved surface portions providing rolling line contact with its associated shift element groove thrust surface during said travel obviating stress concentrations on each insert thereby extending the serivce life thereof.

3. The improved shifting mechanism as set forth in claim 2, whereby each said convex curved surface portion defining a reservoir pocket with its opposed collar groove radial surface, whereby lubricating oil adapted to collect in a respective one of said reservoir pockets for distribution of the oil to an associated collar groove radial surface.

4. The improved shifting mechanism as set forth in claim 1, whereby said synthetic resing material is "Torlon".

5. The improved shifting mechanism as set forth in claim 1, whereby said predetermined differential dimension being of the order of 0.15 mm, thereby substantially increasing the effective insert thrust face bearing load support area relative to an existing shift element groove side thrust surface.

* * * * *